April 27, 1965 C. W. HILL 3,180,967
GAS LENS SHIELDED ARC TORCH
Original Filed March 20, 1961

INVENTOR.
CLIFFORD W. HILL
BY Richard S. Shreve Jr.
ATTORNEY 3,180,967
GAS LENS SHIELDED ARC TORCH
Clifford W. Hill, Mountainside, N.J., assignor to Union Carbide Corporation, a corporation of New York
Continuation of abandoned application Ser. No. 96,970, Mar. 20, 1961. This application Jan. 18, 1963, Ser. No. 254,036
2 Claims. (Cl. 219—75)

This invention relates to gas lens shielded arc torches provided with a screen or series of screens for producing coherent streaming of shielding gas through considerable distances upon exiting from the welding torch. This invention constitutes an improvement on the invention of Gorman and Nelson according to copending application Serial No. 24,550, filed April 25, 1960, now Patent No. 3,053,968, wherein coherent streaming over large distances is obtained without the aspiration of air into the shielding gas stream, thereby preventing contamination of the weld zone.

The main object of this invention is to provide means for mounting such gas lens on a welding torch of the class described in Patent No. 2,468,805. Other objects are to provide optimum construction and material for the gas lens, to obtain adequate shielding of the arc operation with the extension of the welding electrode beyond the lens or torch nozzle for a distance of about one inch, to avoid the necessity of providing a torch nozzle for guiding the exiting shielding gas into the weld zone, and to facilitate maximum operator convenience with a minimum susceptibility to loss or damage of components.

Figure 1:
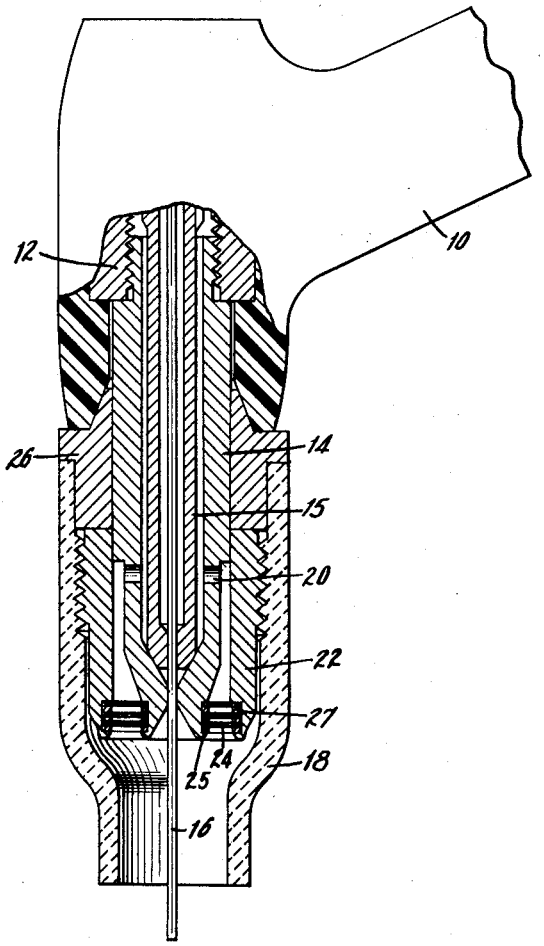
FIGURE 1 is an elevation, largely in vertical axial section, of a torch according to the preferred embodiment, with the lens mounted independent of the nozzle.
Figure 3:
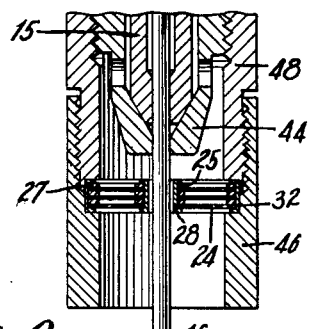
FIGURE 3 is a similar section of a modification with the lens mounted independent of the collet body.
Figure 4:
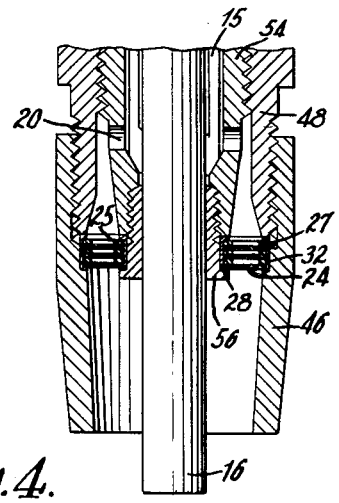
FIGURE 4 is a similar section of a modification with the lens mounted on the collet body in contact with the nozzle.

Tests performed with the torches shown in FIGS. 1, 3, and 4, indicated excellent shielding of the weld metal with a welding electrode extension of one inch. In addition, when the torch nozzle was removed, excellent shielding was obtained with the electrode extending 5/8 in. beyond the collet body.

Among the several advantages to the substantial extensions of the electrode are two principle benefits: much greater than heretofore possible visibility of the weld area, thus making it easier for the operator to make high quality welds, and greater accessibility of the weld operation into confined locations. The fine screen system also results in better shielding in those cases where turbulence caused contamination of the weld. For an equal electrode extension during a select welding condition, two comparable torches, one with and one without a gas lens, resulted in lower gas flows for that torch with the gas lens. As a result, welding economies lend themselves to such arrangement.

During smokebox tests, various porous members were considered. It was found that a total of at least three layers of fine screens produced the most favorable results and appeared to provide the most practical solution. A 400 mesh screen provided the longest coherent streaming distance. However, because of its shortcomings (little strength and poor resistance to spatter) an alternative arrangement of two 200 mesh screens, together with a 100 mesh screen, were selected.

As the gas first proceeded through the two screens, very excellent lengths of coherent streaming were obtained. The addition of a 100 mesh screen on the outer surface was made to provide mechanical strength and to protect the more delicate fine mesh screens from damage by heat and spatter. This advantage was made possible by the fortuitous discovery that the more rugged coarse mesh screens could be spacially placed at any point in a multiple screen assembly without adversely affecting the coherent stream of the issuing gas. Depending on the exact specifications of the coarse mesh screen, it might contribute only slightly towards improving coherent streaming. However, its other advantages, namely, strength, durability, mass and spatter resistance, contribute to the benefit of the entire screen assembly.

Another important advantage of this invention involves the careful determination of the optimum length of the separation between wire screens. Performance with spacers 0.038 in. thick proved to be satisfactory. It was found advantageous to have relatively large space between the various screens in order to provide a "healing" of the gas stream caused by passing gas through one screen before proceeding to the next one. However, a large space of thickness does not meet the demands of this invention since one of the objectives is to provide a torch which is not of great proportions. Therefore, in order to conserve space and yet to provide as large an active surface area as possible, the walls on the collet body adjacent to the screen or series of screens are necessarily thin. If this were not so, a series of thick spacers would result in insufficient cooling of the collet body and possible overheating.

Another advantage of this invention is the elimination of streams of high velocity gas flow directed immediately into the screens. Such screens act to reduce the extent of coherent streaming with consequent loss of gas shielding performance. On the other hand, while the addition of screen layers would act to correct this condition, such advantages would naturally increase the cost and price of such an assembly. With the present invention, the shielding gas flows radially outward from a number of annulli in the collet body and thereafter such shielding gas strikes the inside diameter of a sleeve. The sleeve acts as a baffle and converts the high velocity, small area streams to spread out into a low velocity, large area gas flow, prior to entering the screens. Still another contributing factor is that by means of friction, the kinetic energy is reduced which further aids in the formation of coherent streaming as the gas flows through the wire screen.

By use of such screens, a greater mass can be employed at the lower portion of the collet body. The increased mass insures greater cooling, thus eliminating the common problem of having the welding electrode adhere to the collet. It is also now possible to use a sufficient mass to provide for a larger collet and welding electrode than was previously possible with this torch size. With previous torch configurations, it was found to be necessary to employ a relatively large open annulus area between the collet body and the collet in order to obtain acceptable gas shielding. However, with the present invention, this open area can be decreased, thus permitting the insertion of a larger collet and welding electrode. As an example, where only a 1/8 in. welding electrode could be used in the past, it is now possible to use a 5/32 in. electrode. Such an arrangement permits greater flexibility in the welding operation. In addition, it is most noteworthy to observe that as a result of using such screens, exceptionally low pressure gas drops through such screens result. Because of this fact, sealing about the edges of such screens does not present a difficulty and, in fact, is not critical, thereby eliminating the probability of gas jetting.

The torch comprises a body 10 having a head 12 preferably covered with insulation, and a barrel or collet body 14 having therein an electrode holder or collet 15 to receive an electrode 16. The body is also provided with a shielding gas directing nozzle 18, preferably of insulating material.

Electric current is supplied through the collet 15 to the electrode 16, and shielding gas is supplied through the barrel 14 and out through apertures 20 to the inside of the nozzle 18.

In the form shown in FIG. 1, a sleeve 22 preferably of metal, surrounds a lower smaller diameter portion of the collet body 14, forming an inner shielding gas chamber. The sleeve 22 acts to baffle incoming gas entering this inner chamber through point of entry 20.

The inner wall of the sleeve 22 near the bottom is provided with an annular recess, and the periphery of the collet body 14 is provided with a corresponding recess. A series of annular fine screens 24 are fitted into these corresponding recesses, separated by inner spacer rings 25 and outer annular spacer rings 27. The sleeve 22 constrains the lateral movement of the screens 24 and holds them in fixed spaced relation relative to the apertures 20 and normal to the sleeve.

Insulator 26 mounted between the torch body 10 and insulating nozzle 18 provides sufficient gap between the metallic surfaces of sleeve 22, collet body 14, and any outside ground object to prevent arcing.

Figure 2:
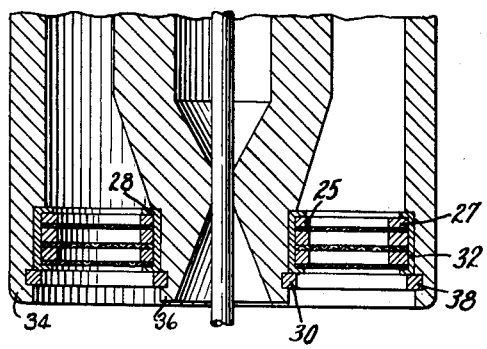
FIGURE 2 is a similar section of a modification with the lens as a removably mounted package.

Under certain welding conditions, the rapid accumulation of spatter on the screens 24 causes difficulty, and it is desirable to merely replace the screens. As shown in FIG. 2, such ease of removal is accomplished by providing a subassembly or package for the wire screens 24 and spacers 25 and 27. These are formed into packages by inner sleeves 28 and outer sleeves 32. The inner sleeve 28 slides over the bottom of the collet body 34, and is held in place by inner snap ring 30. The outer sleeve 32 slides inside the nozzle 36, and is held in place by snap ring 38.

In FIG. 3, the package of screens 24 is mounted below the bottom of the collet body 44. The inner sleeve 28 closely surrounds the electrode 16, and the outer sleeve 32 is clamped between nozzle part 46 screwed into sleeve part 48.

In FIG. 4, also the outer sleeve 32 is clamped between nozzle part 46 screwed into sleeve part 48, but the inner sleeve 28 is clamped between collet body 54 and a plug 56 thereinto.

Figure 5:
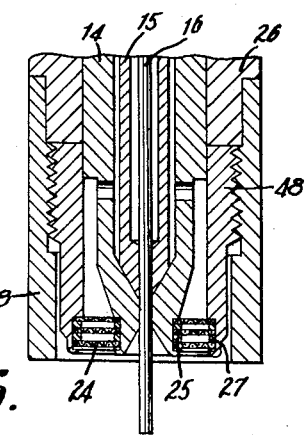
FIGURE 5 is a similar section of a modification having a foreshortened nozzle, with the lens mounted independently thereof.

In FIG. 5, the nozzle 58 is foreshortened so as to permit welding in areas which are difficult to reach with the longer nozzle 18 of FIG. 1. Such modification would not be feasible were it not for the use of fine screens 24. Without such screens, the issuing gases would exit in a turbulent manner whereby such turbulence would cause an influx of air into the weld zone. Such air tends to react with the weld puddle resulting in deleterious effects upon the welding reaction. However, with such screens 24 as in present invention, it eliminates this undesirable condition. The issuing gas as it passes through screens 24 is transformed from a substantially turbulent stream into one that is almost completely nonturbulent. As a result, the welding reaction is not adversely affected by the possible infusion of air within the shielding gas stream. Another very important advantage is realized by this arrangement where electrode 14 may be extended for a substantial distance up to 1 in. beyond the lower edge of the torch nozzle 58. This permits such greater than normal visibility; allowing the operator to see the weld puddle and surrounding area. As a result, high quality welds are produced. Again, by means of this arrangement, accessibility into hard to reach areas is facilitated. In addition, electrode stub loss due to ordinary usage of the electrode is only about 45 percent of that previously obtainable.

The forms shown in FIGS. 1, 3 and 4 were weld tested and produced excellent weld shielding.

The form shown in FIG. 1 is not as subject to loss or damage of parts, can use standard nozzles, has greatest operator convenience.

The form shown in FIG. 3 has the largest effective lens face area for control of gas flow pattern, the lens is easily replaceable, the screen area can be matched to different nozzle areas and this form is generally the simplest and least costly construction.

The form shown in FIG. 4 requires only one lens for a range of nozzle and electrode sizes, one collet body serves for range of electrode sizes, with change of tip. The lens is cooled and not exposed to arc and electrode heat. This form is less subject to spatter pickup and is easily replaceable in case of damage.

This application is a continuation of my copending application Serial No. 96,970, filed March 20, 1961, now abandoned.

What is claimed is:

1. In a gas shielded arc torch having a body, means for supporting an electrode in said body and a gas directing nozzle surrounding the lower portion of said electrode and having a discharge orifice, means for supplying electric current to said electrode, said body having an inner passage for shielding gas with outlets to said nozzle, the combination therewith of an annular gas lens mounted inside said nozzle surrounding the electrode below said outlets and above the discharge orifice of said nozzle, said lens comprising superimposed wire screens having aligned central apertures through which said electrode passes, an inner retaining sleeve passing through all of said apertures, and an outer retaining sleeve receiving the peripheries of said screens and co-operating with said inner sleeve to hold said screens together to form a removable package thereof.

2. In a gas shielded arc torch having a body, an electrode holder in said body, a gas directing nozzle surrounding the lower portion of the electrode and having a discharge orifice, means for supplying electric current to said electrode, said body having an inner passage for shielding gas with outlets to said nozzle, the combination therewith of an annular gas lens mounted inside said nozzle surrounding the electrode below said outlets and above the discharge orifice of said nozzle, said lens comprising superimposed wire screens having aligned central apertures through which said electrode passes, spacer rings between said screens, the inner spacer rings surrounding the electrode and the outer spacer rings being inside said nozzle, a sleeve inside said nozzle, said screens and inner spacer rings being mounted on a small diameter lower end of said holder, and said screens and outer spacer rings being mounted inside the bottom of said sleeve.

References Cited by the Examiner
UNITED STATES PATENTS 1,641,350   9/27   Nieberding _____ 158—112 X
3,053,968   9/62   Gorman et al. _____ 219—74

RICHARD M. WOOD, Primary Examiner.

JOSEPH V. TRUHE, Examiner.